US012639535B1

(12) United States Patent
 Kim

(10) Patent No.: US 12,639,535 B1
(45) Date of Patent: May 26, 2026

(54) DEVICE FOR GENERATING TWO-DIMENSIONAL BARCODE INKED TO NFC DATA USING NFC TAG

(71) Applicant: 3A LOGICS Co., LTD., Seongnam-si (KR)

(72) Inventor: SungWan Kim, Seongnam-si (KR)

(73) Assignee: 3A LOGICS Co., LTD., Seongnam-si (KR)

( * ) Notice: Subject to any disclaimer, the term of this patent is extended or adjusted under 35 U.S.C. 154(b) by 0 days.

(21) Appl. No.: 19/176,069

(22) Filed: Apr. 10, 2025

(30) Foreign Application Priority Data

Nov. 24, 2024 (KR) ......................... 10-2024-0169169
Nov. 24, 2024 (KR) ......................... 10-2024-0169171

(51) Int. Cl.
 *G06K 1/12* (2006.01)
 *G06K 7/10* (2006.01)
 *G06Q 50/12* (2012.01)
(52) U.S. Cl.
 CPC ........... *G06K 1/12* (2013.01); *G06K 7/10297* (2013.01); *G06Q 50/12* (2013.01)

(58) Field of Classification Search
 CPC ........ G06K 1/12; G06K 1/14; G06K 7/10297; G06Q 50/12
 See application file for complete search history.

(56) References Cited

U.S. PATENT DOCUMENTS

2025/0285101 A1* 9/2025 Choi ..................... H04L 9/0618

FOREIGN PATENT DOCUMENTS

| JP | 2011-065562 | 3/2011 |
|----|-------------|--------|
| JP | 2013-117749 | 6/2013 |
| KR | 10-1584953 | 1/2016 |
| KR | 10-2017-0140508 | 12/2017 |
| KR | 10-2131513 | 7/2020 |
| KR | 10-2020-0119558 | 10/2020 |
| KR | 10-2024-0025803 | 2/2024 |
| KR | 10-2720034 | 10/2024 |

* cited by examiner

*Primary Examiner* — Laura A Gudorf

(57) ABSTRACT

Provided is a variable 2D barcode generation device. The variable 2D barcode generation device includes an NFC tag configured to store URL information for accessing a webpage and generate an antenna voltage by collecting electromagnetic waves emitted from a portable device, a display device, and a 2D barcode controller configured to read the URL information based on the antenna voltage to generate a 2D barcode mapped to the URL information in real time, and display the 2D barcode on the display device.

12 Claims, 7 Drawing Sheets

NFC Order

2D Barcode Order

DEVICE FOR GENERATING TWO-DIMENSIONAL BARCODE INKED TO NFC DATA USING NFC TAG

CROSS-REFERENCE TO RELATED APPLICATIONS

This application claims priority under 35 U.S.C. § 119 from Korean Patent Application No. 10-2024-0169169, filed on Nov. 24, 2024, and No. 10-2024-0169171, filed on Nov. 24, 2024 the disclosure of each of which is hereby incorporated by reference in its entirety.

BACKGROUND

The present invention relates to a two-dimensional (2D) barcode generation device, and more particularly, to a device and a method for generating a 2D barcode that is mutually linked with NFC data in real time, and an operating method of a system including the device.

Table Order refers to a method in which a customer places an order while sitting at a table in a restaurant, cafe, or bar.

Table order methods include a table order method through calling a staff member, in which a customer sits at a table and orders a menu directly to the staff member, and a digital table order method in which a customer scans a 2D barcode (e.g., QR code) or NFC tag placed on a table to check the menu and place an order with his or her smartphone.

Digital table order methods include a QR order method in which a customer places an order directly by scanning a QR code attached to a table, poster, kiosk, or menu, and an NFC order method in which a non-face-to-face order and payment are performed using near field communication (NFC) technology.

In the QR order method, a customer scans a QR code with a camera or QR scanner application on his or her smartphone, and when the QR code is scanned, the smartphone is connected to a menu page or an ordering system website.

In the NFC ordering method, when a customer brings his or her smartphone close to a designated NFC tag at a table, menu, or kiosk and tags it, the smartphone is automatically connected to a webpage or application through an NFC signal.

SUMMARY

An object of the present invention is to provide, since, if a 2D barcode that has been used once is leaked through a blog or SNS, anyone can scan the 2D barcode to misuse it (for example, false orders), and a fake 2D barcode that induces a malicious link may be used to commit a Qshing (i.e., an abbreviation for phishing using a QR code) fraud, a 2D barcode generating device that may link variable data (for example, uniform resource locator (URL) information) generated using NFC to a 2D barcode to prevent such problems, and an operating method thereof.

An exemplary embodiment of the present invention is directed to a variable 2D barcode generation device, including an NFC tag configured to store URL information for accessing a webpage and generate an antenna voltage by collecting electromagnetic waves emitted from a portable device, a display device, and a 2D barcode controller configured to read the URL information from the NFC tag based on the antenna voltage to generate a 2D barcode mapped to the URL information in real time, and display the 2D barcode on the display device.

Another exemplary embodiment of the present invention is directed to a variable 2D barcode generation device, including an NFC tag configured to store URL information for accessing a webpage, a display device, a switch configured to generate an interrupt signal, and a 2D barcode controller configured to read the URL information from the NFC tag in response to the interrupt signal to generate a 2D barcode mapped to the URL information in real time, and display the 2D barcode generated in real time on the display device.

Still another exemplary embodiment of the present invention is directed to a variable 2D barcode generation device, including an NFC tag configured to store URL information for accessing a webpage and generate an interrupt request signal when electromagnetic waves emitted from a portable device are received, a display device, and a 2D barcode controller configured to read the URL information from the NFC tag in response to the interrupt request signal to generate a 2D barcode mapped to the URL information in real time, and display the 2D barcode on the display device in real time.

Still another exemplary embodiment of the present invention is directed to a variable 2D barcode generation device, including an NFC tag configured to store URL information for accessing a webpage, a display device, a switch configured to generate an interrupt signal, and a 2D barcode controller configured to read the URL information from the NFC tag in response to the interrupt signal to generate a 2D barcode mapped to the URL information in real time, and display the 2D barcode on the display device in real time.

BRIEF DESCRIPTION OF DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE EMBODIMENTS

Figure 1:
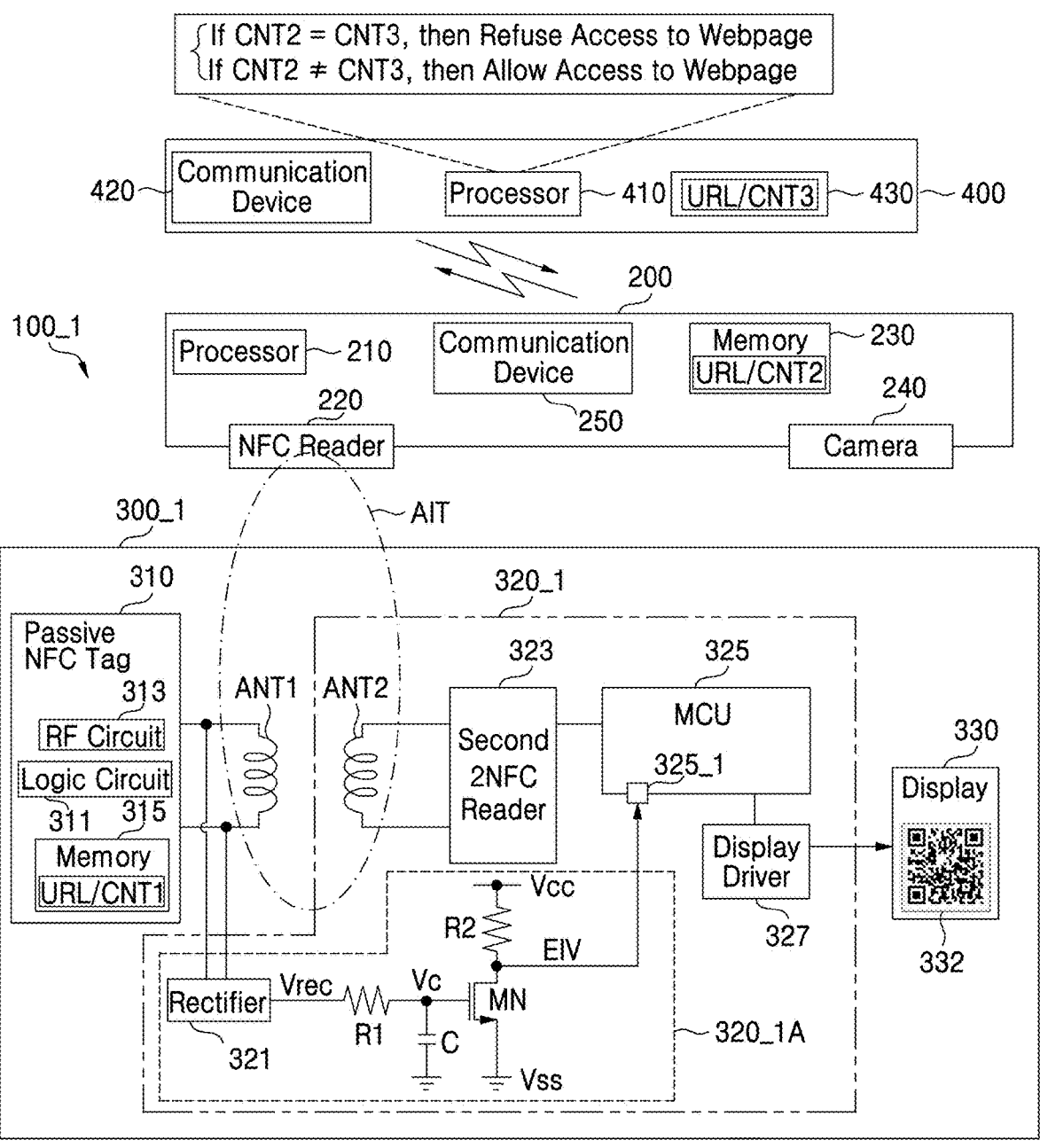
FIG. 1 is a schematic block diagram of a system including a variable two-dimensional (2D) barcode generation device that generates a 2D barcode linked to NFC data using a passive NFC tag according to an embodiment of the present invention.

FIG. 1 is a schematic block diagram of a system including a variable 2D barcode generation device that generates a 2D barcode linked to NFC data using a passive NFC tag according to an embodiment of the present invention.

Referring to FIG. 1, a system 100_1, for example, a variable two-dimensional (2D) barcode generation system 100_1, includes a portable device 200, a variable 2D barcode generation device 300_1, and a server 400.

The server 400 may refer to a server (or cloud) that provides a service for providing and managing computing resources (e.g., a server, a data storage, an application, and/or the like) through the Internet, or a virtualized server that may be accessed through the Internet.

The portable device 200 may be a mobile device including a processor 210, a near field communication (NFC) reader 220, a memory device 230, a camera 240, and a communication device 250, and may be, but is not limited to, a smart phone, a tablet, a personal digital assistant (PDA), a wearable device, a handheld barcode scanner, or a mobile computer.

The processor 210 may read a 2D barcode captured by the camera 240, interpret information stored in the 2D barcode, and execute a 2D barcode (e.g., QR code) scanning (or processing) program that may transmit the interpreted information to the server 400.

The variable 2D barcode generating device 300_1 includes a passive NFC tag 310 including a first antenna ANT1, a 2D barcode controller 320_1 including a second antenna ANT2, and a display device 330. The NFC tag 310 may store URL information for accessing a webpage and generate an antenna voltage by collecting or harvesting electromagnetic waves emitted from a portable device 200.

The variable 2D barcode generation device 3001, 300_2, or 300_3 may be a table order (or table ordering) device. The variable 2D barcode generation device 3001, 300_2, or 300_3 may generate a 2D barcode mapped to URL information (also referred to as 'NFC data') in real time and display it on the display device 330 whenever an interrupt signal (EIV of FIG. 1 or FIG. 2 or IRQ of FIG. 7) is generated, so that the 2D barcode linked to the URL information may be dynamically updated.

According to embodiments, the variable 2D barcode generating device 300_1 may further include a power source (e.g., a battery, or an adapter that converts an AC signal into a DC signal) capable of supplying an operating voltage to each of elements (or components) 320_1A, 323, 325, 327, and 330.

The variable 2D barcode generating device 3001, 300_2, or 300_3 described in this specification may be a display device equipped with an electronic paper (e-paper) and an NFC chip, for example, a E-paper NFC Display (ENDi).

The NFC reader 220 and the passive NFC tag 310 may perform radio frequency (RF) communication, for example, NFC communication, through an antenna of the NFC reader 220 and the first antenna ANT1. A frequency used for the NFC communication may be 13.56 MHz.

The 2D barcode controller 320_1 may perform RF communication, for example, NFC communication, through the first antenna ANT1 and the second antenna ANT2.

The 2D barcode controller 320_1 includes a second antenna ANT2, an interrupt signal generation circuit 320_1A, a second NFC reader 323, a microcontroller unit (MCU) 325, and a display driver (or display controller) 327.

The interrupt signal generation circuit 320_1A includes a rectifier 321, a first resistor R1, a capacitor C, a second resistor R2, and a switch MN. The second resistor R2 and the switch MN, which are connected in series, are connected between a power line that supplies an operating voltage Vcc and a ground Vss.

The first resistor R1 and the capacitor C may constitute an RC low-pass filter, and the RC low-pass filter performs low-pass filtering on a rectified voltage Vrec to generate a control voltage Vc.

The interrupt signal generation circuit 3201A generates an interrupt signal EIV with a low level (L) according to the control voltage Vc generated based on an NFC signal (or electromagnetic waves) transmitted (or emitted) from the NFC reader 220 of the portable device 200, and outputs this signal EIV to an interrupt terminal 325_1 of the MCU 325. The interrupt terminal 325_1 is connected to an output terminal of the switch MN.

The MCU 325 according to the present disclosure is an active low controller that is enabled or woken up according to the interrupt signal EIV with a low level (L). When a specific event occurs, for example, when the interrupt signal EIV with a low level (L) occurs, the MCU 325 temporarily suspends a currently executing task and operates the second NFC reader 323 to process the specific event, for example, to read URL information (URL/CNT1) stored in a memory device 315.

Figure 2:
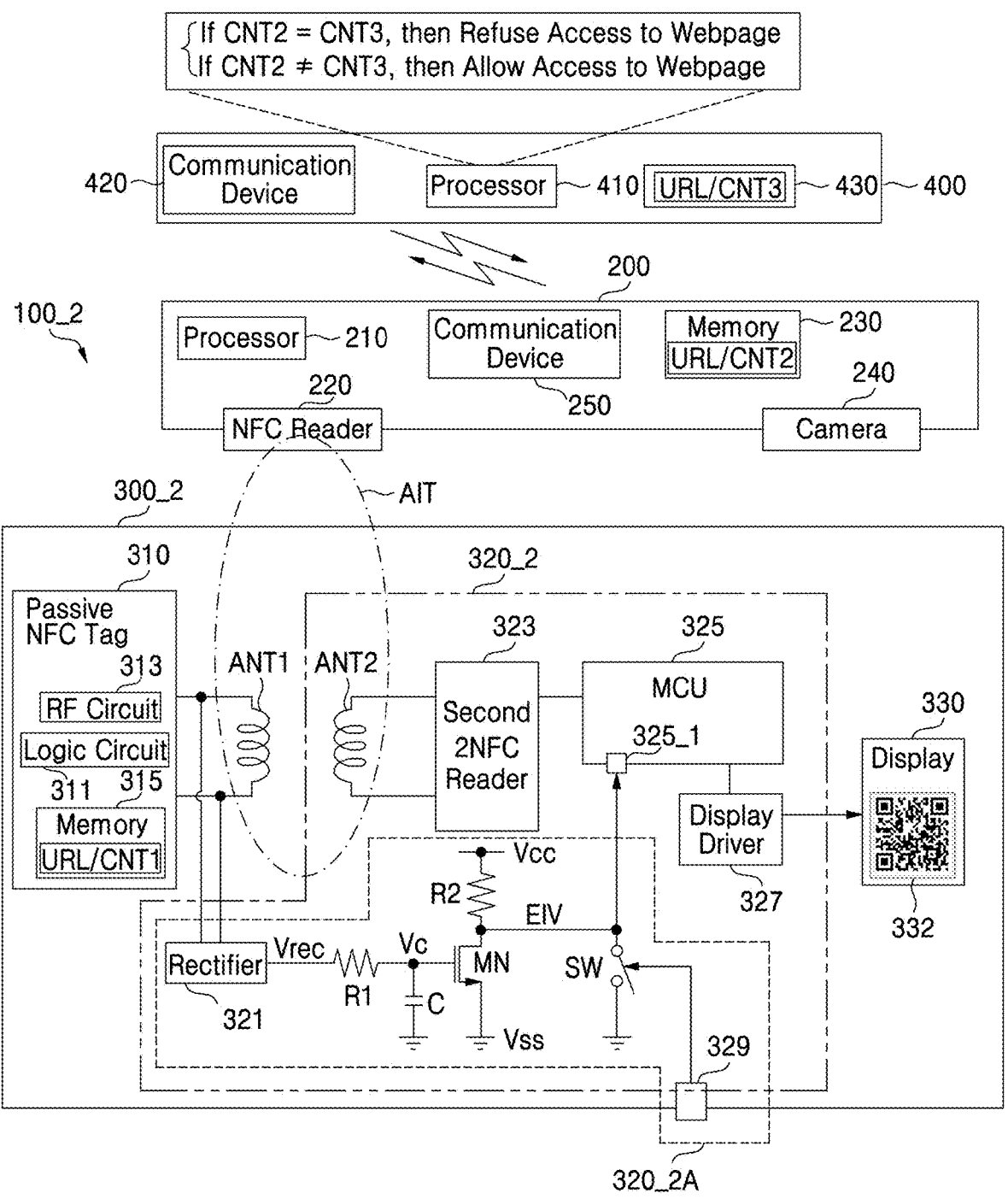
FIG. 2 is a schematic block diagram of a system including a variable 2D barcode generation device that generates a 2D barcode linked to NFC data using a passive NFC tag and a switch according to an embodiment of the present invention.
Figure 3:
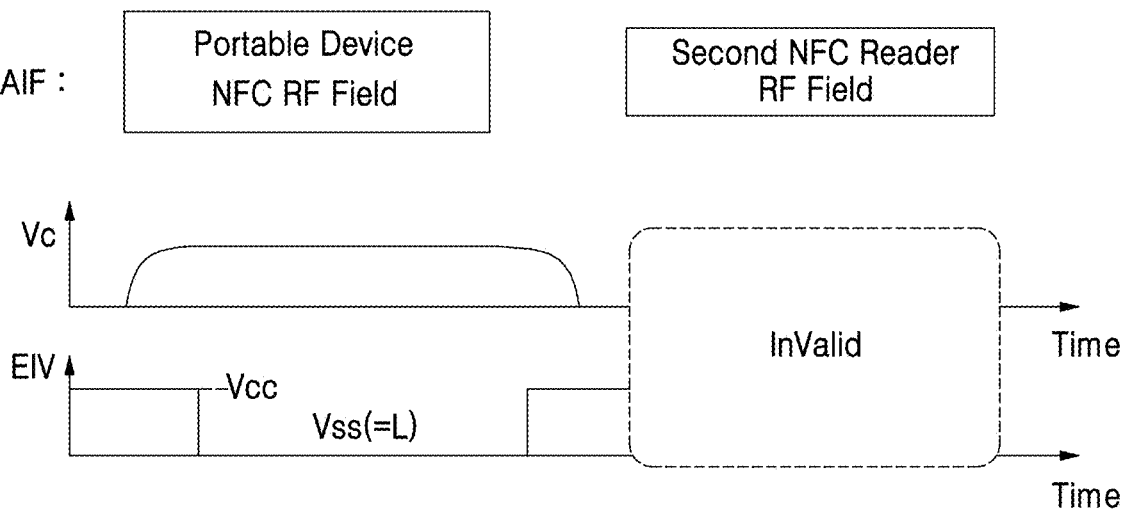
FIG. 3 is a timing diagram of signals for describing an operation of the variable 2D barcode generation device shown in FIG. 1 or FIG. 2.
Figure 4:
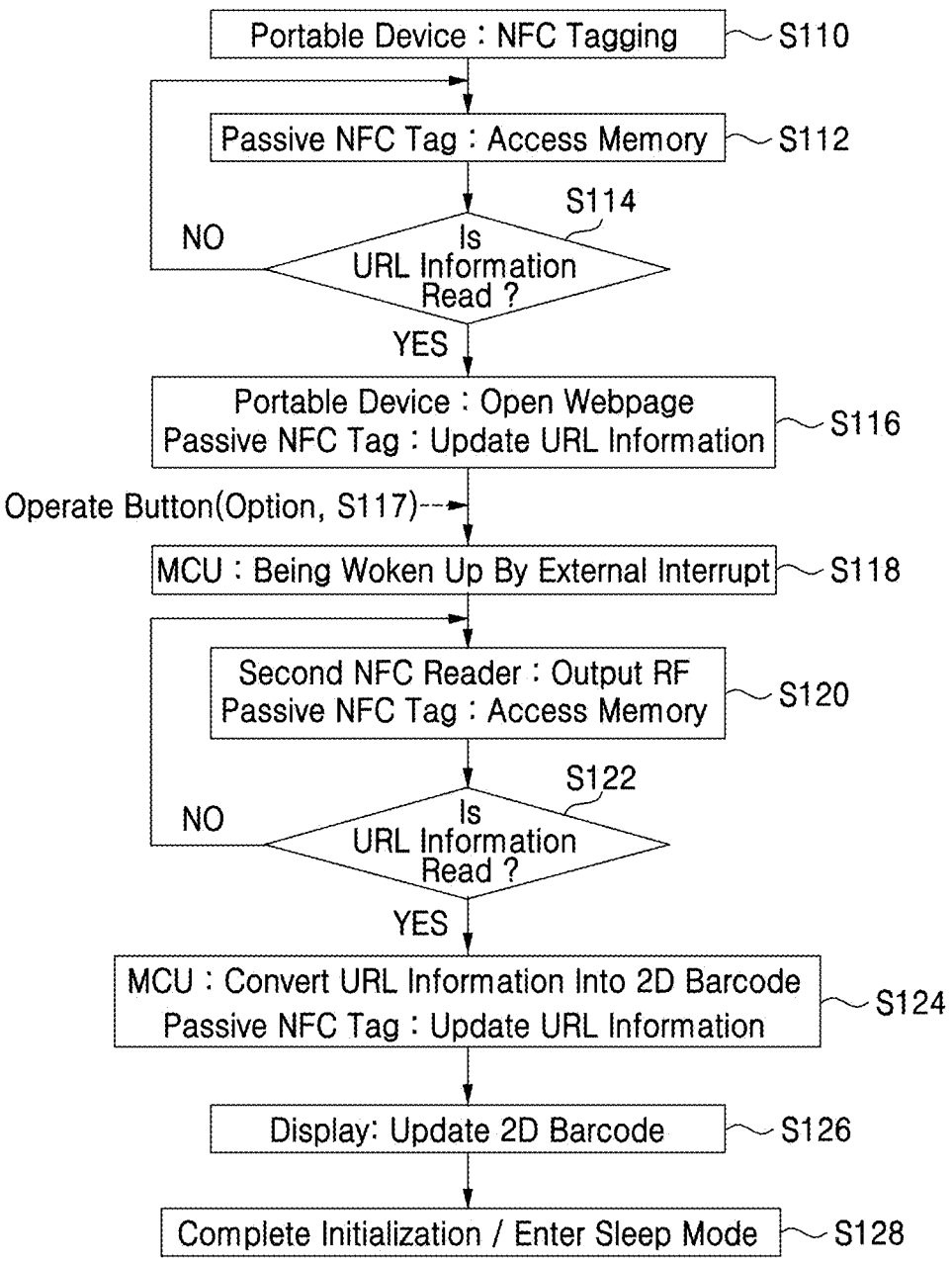
FIG. 4 is a flowchart for describing a setup process of the variable 2D barcode generation device shown in FIG. 1 or FIG. 2.

FIG. 3 is a timing diagram of signals for describing an operation of the variable 2D barcode generation device shown in FIG. 1 or FIG. 2, and FIG. 4 is a flowchart for describing a setup process of the variable 2D barcode generation device shown in FIG. 1 or FIG. 2.

A wake-up or setup process of the variable 2D barcode generation device 300_1 will be described in detail with reference to FIG. 1, FIG. 3, and FIG. 4.

A user of the portable device 200 performs NFC tagging on the variable 2D barcode generation device 3001 using the NFC reader 220 of the portable device 200 (S110).

When an RF circuit (or RF transceiver) 313 of the passive NFC tag 310 receives an NFC signal transmitted from the NFC reader 220 through the first antenna ANT1 and outputs it to a logic circuit 311, the logic circuit 311 extracts a URL read command (also referred to as a 'URL transmission command') included in the NFC signal, and accesses the memory device 315 to read the URL information (URL/CNT1) stored in the memory device 315 according to the extracted URL read command (S112).

The URL information (URL/CNT1) includes a uniform resource locator (URL) for accessing a webpage provided by the server 400 and a first count value CNT1. It is assumed that the first count value CNT1 is initially set to '0.'

The logic circuit 311 reads the URL information (URL/CNT1 (=0)) from the memory device 315 and transmits it to the RF circuit 313 (YES in S114). However, when the URL information (URL/CNT1 (=0)) is not normally read from the memory device 315 (NO in S114), the logic circuit 311 performs a memory access operation to read the URL information (URL/CNT1 (=0)) from the memory device 315 (S112).

In this specification, the memory access operation may be performed only a preset number of times (e.g., 3 times) to prevent the steps (S112 and S114, and S120 and S122) from falling into an infinite loop.

The RF circuit 313 that has received the URL information (URL/CNT1(=0)) from the memory device 315 transmits the URL information (URL/CNT1(=0)) to the NFC reader 220 through the first antenna ANT1.

The processor 210 of a portable device 200 may receive the URL information (URL/CNT1(=0)) through the NFC reader 220 and use the communication device 250 to access a webpage corresponding to the URL included in the URL information (URL/CNT1(=0)) and open the webpage (S116).

The logic circuit 311 reads the URL information (URL/CNT1(=0)) from the memory device 315, transmits it to the RF circuit 313, updates the URL information (URL/CNT1 (=0)), and stores the updated URL information (URL/CNT1 (=1)) in the memory device 315 (S116).

For example, the logic circuit 311 may update the first count value CNT1 included in the URL information (URL/CNT1) from '0' to '1' and store an updated URL information (URL/CNT1(=1)) including an updated first count value (CNT1=1) in the memory device 315 (S116).

When the NFC reader 220 of the portable device 200 performs NFC tagging on the variable 2D barcode generation device 300_1 (S110), that is, when an NFC RF field of FIG. 3 is formed (S110), the first antenna ANT1 of the 2D barcode generation device 300_1 receives an RF signal (also referred to as 'wireless energy' or 'wireless power') from the NFC reader 220 through an air interface (AIF).

Accordingly, the rectifier 321 receives and rectifies the RF signal (e.g., an antenna voltage) of the first antenna ANT1 to generate a rectified voltage Vrec, and supplies the rectified voltage Vrec to a control terminal of the switch MN through the first resistor R1.

Since the capacitor C is connected between the control terminal of the switch MN and the ground Vss, the control voltage Vc of the control terminal of the switch MN increases as the rectified voltage Vrec is charged to the capacitor C. The switch MN may be implemented as an NMOS transistor.

When the NMOS transistor MN is turned on as the control voltage Vc supplied to a gate terminal of the NMOS transistor MN increases, a voltage EIV of a common node of the second resistor R2 and the NMOS transistor MN, i.e., the interrupt signal EIV, is pulled down to a ground Vss level.

The NMOS transistor MN generates an interrupt signal EIV, for example, the interrupt signal EIV with a low level (L), when the control voltage Vc is higher than a reference voltage corresponding to a threshold voltage of the NMOS transistor MN.

As the interrupt signal EIV supplied to the interrupt terminal 325_1 transitions from an operating voltage Vcc level to the ground Vss level, the MCU 325 is enabled or woken up in response to the interrupt signal EIV (S118).

The enabled or woken-up MCU 325 controls the second NFC reader 323 so that the second NFC reader 323 outputs an RF signal, for example, an NFC signal, to the first antenna ANT1 (S120).

When the RF circuit 313 of the passive NFC tag 310 receives an NFC signal transmitted from the second antenna ANT2 of the second NFC reader 323 through the first antenna ANT1 and transmits the NFC signal to the logic circuit 311, the logic circuit 311 extracts a URL read command included in the NFC signal and accesses the memory device 315 to read the URL information (URL/CNT1 (=1)) stored in the memory device 315 according to the extracted URL read command (S120).

When the first antenna ANT1 receives an NFC signal from the second antenna ANT2 through the air interface AIF, i.e., an RF field, formed by inductance coupling or magnetic resonance coupling between the first antenna ANT1 and the second antenna ANT2, the rectifier 321 generates a rectified voltage Vrec. Accordingly, the interrupt signal EIV is pulled down to the ground Vss level.

Since the MCU 325 has already controlled an operation of the second NFC reader 323 according to the interrupt signal EIV with a low level (L), the MCU 325 determines the interrupt signal EIV with a low level (L), generated based on the NFC signal, for example, a second interrupt signal EIV with a low level (L), as an invalid signal.

Therefore, the MCU 325 does not control the operation of the second NFC reader 323 to read the URL information (URL/CNT1 (=1)) stored in the memory device 315.

The URL information (URL/CNT1 (=1)) stored in the memory device 315 according to step (S116) includes a URL and the first count value (CNT1=1).

The logic circuit 311 of the passive NFC tag 310 reads the URL information (URL/CNT1) including the first count value (CNT1=1) from the memory device 315 and transmits it to the RF circuit 313 (YES in S122). However, when the URL information (URL/CNT1 (=1)) is not normally read from the memory device 315 (NO in S122), the logic circuit 311 performs the memory access operation again to read the URL information (URL/CNT1 (=1)) from the memory device 315 (S120).

The RF circuit 313 that has received the URL information (URL/CNT1) including the first count value (CNT1=1) from the memory device 315 transmits the URL information (URL/CNT1) to the second antenna ANT2 through the first antenna ANT1 (S122).

When the second NFC reader 323 receives the URL information (URL/CNT1) including the first count value (CNT1=1) and transmits it to the MCU 325, the MCU 325 converts the URL information (URL/CNT1) including the first count value (CNT1=1) into a 2D barcode (this is also referred to as '2D barcode information') and outputs a converted 2D barcode to a display driver 327.

MCU 325 encodes the URL information (URL/CNT1 (=1)) in a form of a text string to fit a 2D barcode (e.g., QR code) data structure, converts the encoded URL data into a form of a 2D matrix, and generates a 2D barcode in the form of a 2D matrix.

For example, when the 2D barcode generating device 300_1 is a device for table ordering, the URL information (URL/CNT1) may include a URL, store information for identifying a store, branch information for identifying a branch, table information for identifying a table, and the first count value CNT1.

The logic circuit 311 reads the URL information (URL/CNT1) including the first count value (CNT1=1) from the memory device 315, transmits it to the RF circuit 313, updates URL information(URL/CNT1(=1)), and stores an updated URL information (URL/CNT1(=2)) in the memory device 315 (S124).

For example, the logic circuit 311 may update the first count value CNT1 included in the URL information (URL/CNT1) from '1' to '2,' generate an updated URL information (URL/CNT1) including an updated first count value (CNT1=2), and store it in the memory device 315 (S124).

The display driver 327 receives a 2D barcode corresponding to the URL information (URL/CNT1) including the first count value (CNT1=1) and transmits it to the display device 330. Accordingly, a 2D barcode (e.g., a dummy barcode or a previous 2D barcode) displayed on the display device 330 is updated to a 2D barcode (or a new 2D barcode) 332 corresponding to the URL information (URL/CNT1) including the first count value (CNT1=1) (S126). The display device 330 may be electronic paper.

According to steps S110 to S126, an initialization operation for the 2D barcode generation device 300_1 is completed, and the 2D barcode generation device 300_1 enters a sleep mode (S128).

FIG. 2 is a schematic block diagram of a system including a variable 2D barcode generation device that generates a 2D barcode linked to NFC data using a passive NFC tag and a switch according to an embodiment of the present invention.

Referring to FIG. 2, a variable 2D barcode generation device 300_2 includes a passive NFC tag 310 including a first antenna ANT1, a 2D barcode controller 320_2 including a second antenna ANT2, and a display device 330.

The variable 2D barcode controller 320_2 includes a second antenna ANT2, an interrupt signal generation circuit 320_2A, a second NFC reader 323, an MCU 325, and a display driver 327.

According to embodiments, the variable 2D barcode generation device 3002 may further include a power source (e.g., a battery or an adapter) capable of supplying an operating voltage to each of the elements (or components) 320_2A, 323, 325, 327, and 330.

The interrupt signal generation circuit 320_2A includes the rectifier 321, the first resistor R1, the capacitor C, the second resistor R2, the switch MN, a second switch SW, and a button 329.

The interrupt signal generation circuit 320_2A generates an interrupt signal EIV generated according to the control voltage Vc generated based on an NFC signal transmitted from the portable device 200 or an operation of the button 329, and transmits the interrupt signal EIV to the interrupt terminal 325_1 of the MCU 325.

The operation of the button 329 means an operation or process of generating an interrupt signal EIV with a low level (L) by connecting the interrupt terminal 325_1 and the ground Vss. According to embodiments, the second switch SW and the button 329 may be constituents of a tact switch or a button switch, and the second switch SW and the button 329 may be one element or component. That is, the tact switch or the button switch is an example of an interrupt signal generation button, and the interrupt signal generation button is connected between the interrupt terminal 325_1 and the ground Vss.

The interrupt signal generation circuit 320_2A may automatically generate an interrupt signal EIV with a low level (L) according to the control voltage Vc generated based on an NFC signal transmitted from the NFC reader 220 of the portable device 200, or may generate an interrupt signal EIV with a low level (L) according to an operation (e.g., pressing) of the tact switch.

For example, when the URL information (URL/CNT1) stored in the passive NFC tag 310 and the 2D barcode displayed on the display 330 do not match, when a user of the variable 2D barcode generation device 300_2 presses the button 329 (S117), steps (S118 to S128) may be performed.

Figure 5:
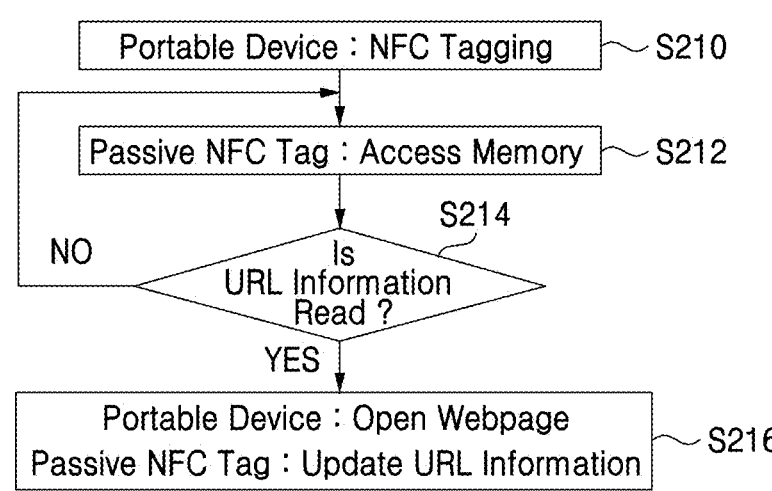
FIG. 5 is a flowchart for describing an NFC order of the variable 2D barcode generation device shown in FIG. 1 or FIG. 2.

FIG. 5 is a flowchart for describing an NFC order of the variable 2D barcode generation device shown in FIG. 1 or FIG. 2. Referring to FIG. 1, FIG. 2, FIG. 4, and FIG. 5, the user performs NFC tagging on the variable 2D barcode generation device 300_1 or 300_2 using the NFC reader 220 of the portable device 200 (S210).

When the RF circuit 313 of the passive NFC tag 310 receives an NFC signal transmitted from the NFC reader 220 through the first antenna ANT1 and outputs the NFC signal to the logic circuit 311, the logic circuit 311 extracts a URL read command included in the NFC signal and accesses the memory device 315 to read the URL information (URL/CNT1) stored in the memory device 315 according to the extracted URL read command (S212).

In the step (S124) of FIG. 4, it is assumed that URL information (URL/CNT1) including the first count value (CNT1=2) is stored in the memory device 315.

The logic circuit 311 reads the URL information (URL/CNT1) including the first count value (CNT1=2) from the memory device 315 and transmits the URL information (URL/CNT1) to the RF circuit 313 (YES in S214). However, when the URL information (URL/CNT1) is not normally read from the memory device 315 (NO in S214), the logic circuit 311 performs the memory access operation again to read the URL information (URL/CNT1) from the memory device 315 (S212).

In the present specification, the memory access operation may be performed a predetermined number of times (for example, 3 times) to prevent the steps (S212 and S214) from falling into an infinite loop.

The RF circuit 313 that has received the URL information (URL/CNT1) including the first count value (CNT1=2) from the memory device 315 transmits the URL information (URL/CNT1) to the NFC reader 220 through the first antenna ANT1.

The processor 210 of the portable device 200 receives the URL information (URL/CNT1) including the first count value (CNT1=2) from the NFC reader 220, generates second URL information (URL/CNT2=URL/CNT1) corresponding to the URL information (URL/CNT1), stores it in the memory device 230, and transmits the second URL information (URL/CNT2=URL/CNT1) to a communication device 420 of the server 400 through the communication device 250. At this time, it is assumed that the first count value (CNT1=2) and a second count value (CNT2=2) are identical.

The processor 410 of the server 400 generates a link for accessing a webpage according to second URL information (URL/CNT2) including the second count value (CNT2=2) through the communication device 420 and transmits it to the communication device 250 of the portable device 200, so that the processor 210 of the portable device 200 may access and open a webpage corresponding to the link received through the communication device 250.

According to an embodiment, the processor 410 of the server 400 may generate third URL information (URL/CNT3) including a third count value (CNT3=2) and store it in a memory device 430. At this time, the second count value (CNT2=2) and the third count value (CNT3=2) are identical.

Figure 6:
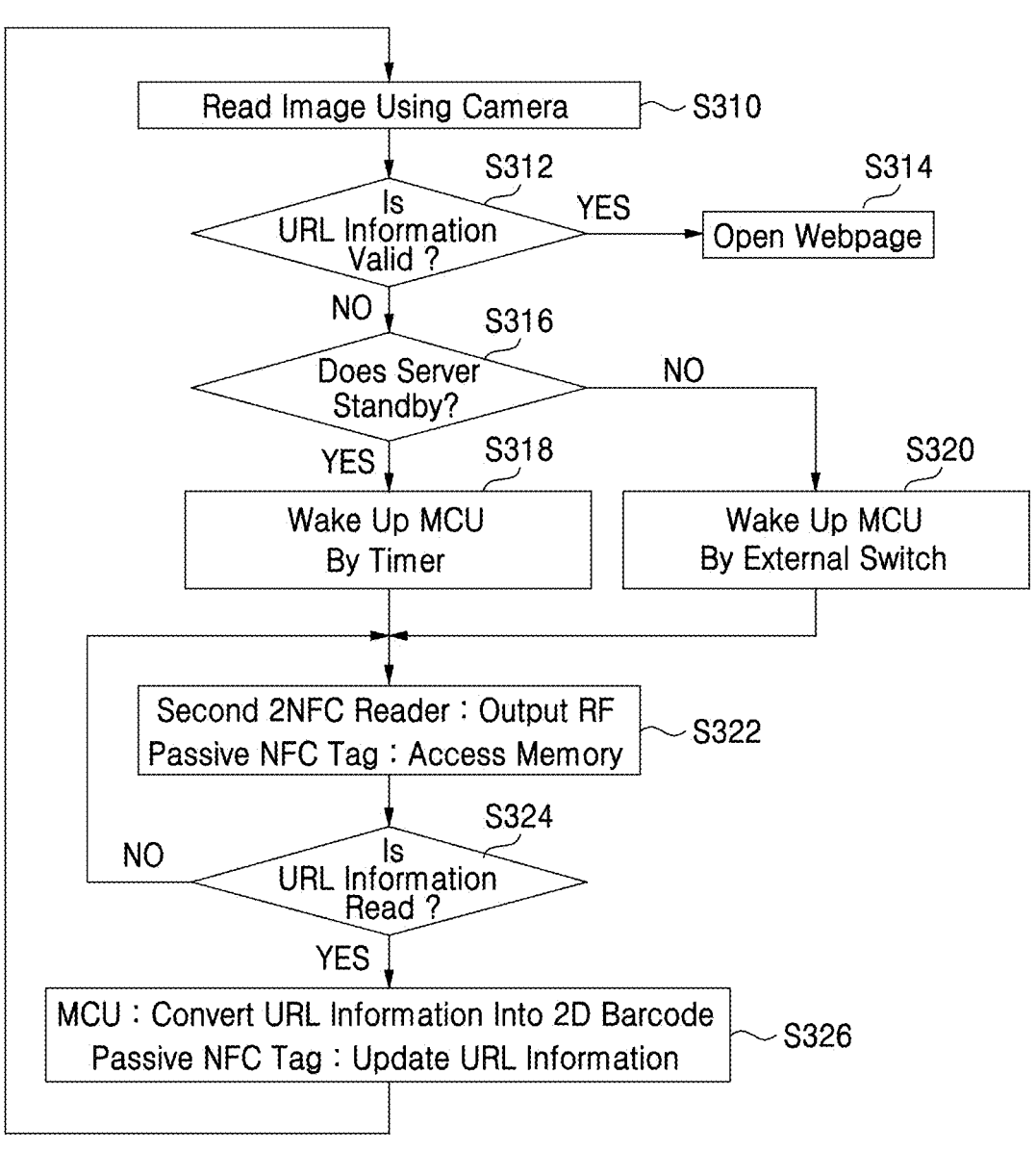
FIG. 6 is a flowchart for describing a 2D barcode order of the variable 2D barcode generation device shown in FIG. 1 or FIG. 2.

FIG. 6 is a flowchart for describing a 2D barcode order of the variable 2D barcode generation device shown in FIG. 1 or FIG. 2.

Referring to FIG. 1, FIG. 2, FIG. 4, and FIG. 6, it is assumed that the 2D barcode 332 displayed on the display device 330 is mapped to a URL and the first count value (CNT1=1), the user of the portable device 200 first accesses a webpage provided by the server 400, corresponding to the URL information (URL/CNT1), the third count value (CNT3) included in the third URL information (URL/CNT3) is '0,' and the URL information (URL/CNT1) including a URL and the first count value (CNT1=2) is stored in the memory device 315.

The user of the portable device 200 takes a picture of the 2D barcode 332 including the URL information (URL/CNT1) that includes a URL and the first count value (CNT1=1) using the camera 240 (S310).

The processor 210 of the portable device 200 receives the 2D barcode 332 captured by the camera 240, uses the URL information (URL/CNT1) including a URL and the first count value (CNT1=1) from a 2D barcode 362 to generate second URL information (URL/CNT2) including a second count value (CNT2=1), and transmits the second URL information (URL/CNT2) to the communication device 420 of the server 400 through the communication device 250. At this time, it is assumed that the URL information (URL/CNT1) and the second URL information (URL/CNT2) are identical or same.

The processor 410 of the server 400 receives the second URL information (URL/CNT2(=1)) through the communication device 420 and determines whether the second URL information (URL/CNT2(=1)) has been used at least once before (S312).

The processor 410 compares the second count value (CNT2=1) included in the second URL information (URL/CNT2) with a third count value (CNT3=0) included in the third URL information (URL/CNT3) stored in the memory device 430 (S312).

When the second count value (CNT2=1) and the third count value (CNT3=0) are not identical (YES in S312), that is, when it is determined that the 2D barcode 332 corresponding to the URL information (URL/CNT1(=1) or URL/CNT2(=1)) has never been used before (YES in S312), the processor 410 determines that the second URL information (URL/CNT2(=1)) mapped to the 2D barcode 332 is valid (YES in S312), allows the portable device 200 to access and open a webpage corresponding to the second URL information (URL/CNT2(=1)), updates the third count value (CNT3) from '0' to '1,' and generates third URL information (URL/CNT3) including a third count value (CNT3=1) to store it in the memory device 430.

To describe a case where the 2D barcode 332 mapped to the second URL information (URL/CNT2) including a URL and the second count value (CNT2=1) has already been used once, the 2D barcode 332 has been leaked through a blog or SNS, or the 2D barcode 332 has been forged or altered, and for a convenience of description, drawing numbers of the portable device 200, the 2D barcode generation device 3002, and the server 400 shown in FIG. 2 are used. At this time, it is assumed that a structure of a portable device of a user is the same as a structure of the portable device 200.

The user takes a picture of the 2D barcode 332 including the URL information (URL/CNT1) that includes a URL and the first count value (CNT1=1) using the camera 240 of the portable device 200 (S310).

The processor 210 of the portable device 200 receives the 2D barcode 362 captured by the camera 240, extracts the URL information (URL/CNT1) including a URL and the first count value (CNT1=1) from the 2D barcode 362, generates second URL information (URL/CNT2) including the second count value (CNT2=1), and transmits the second URL information (URL/CNT2) to the communication device 420 of the server 400 through the communication device 250. At this time, it is assumed that the URL information (URL/CNT1) and the second URL information (URL/CNT2) are identical or same.

The processor 410 of the server 400 receives the second URL information (URL/CNT2) through the communication device 420 and determines whether the second URL information (URL/CNT2) has been used at least once before (S312).

The processor 410 compares the second count value (CNT2=1) included in the second URL information (URL/CNT2) with the third count value (CNT3=1) included in the third URL information (URL/CNT3) stored in the memory device 430 (S312).

Since the second count value (CNT2=1) and the third count value (CNT3=1) are identical, the processor 410 determines that the 2D barcode 332 corresponding to the URL information (URL/CNT1(=1) or URL/CNT2(=1)) has been used before (S312). That is, the processor 410 determines that the second URL information (URL/CNT2 (=1)) is not valid and does not allow an access to the webpage (NO in S312).

When it is determined that the second URL information (URL/CNT2) is not valid (NO in S312), the server 400 stands by until new second URL information (URL/CNT2) is received (S316).

According to an embodiment, a timer (not shown) included in the MCU 325 enables or wakes up the MCU 323 at preset intervals (S318).

The enabled or woken up MCU 325 controls the second NFC reader 323 so that the second NFC reader 323 outputs an NFC signal to the first antenna ANT1 (S322).

When the RF circuit 313 of the passive NFC tag 310 receives an NFC signal transmitted from the second antenna ANT2 of the second NFC reader 323 through the first antenna ANT1 and transmits it to the logic circuit 311, the logic circuit 311 extracts a URL read command included in the NFC signal and accesses the memory device 315 to read URL information (URL/CNT1) stored in the memory device 315 according to the extracted URL read command (S322).

The logic circuit 311 of the passive NFC tag 310 reads the URL information (URL/CNT1) including the first count value (CNT1=2) from the memory device 315 and transmits it to the RF circuit 313 (YES in S324).

However, when the URL information (URL/CNT1) including the first count value (CNT1=2) is not normally read from the memory device 315 (NO in S324), the logic circuit 311 performs the memory access operation again to read the URL information (URL/CNT1) from the memory device 315 (S322).

The RF circuit 313 that has received the URL information (URL/CNT1) including the first count value (CNT1=2) from the memory device 315 transmits the URL information (URL/CNT1) to the second antenna ANT2 through the first antenna ANT1 (S324).

When the second NFC reader 323 receives the URL information (URL/CNT1) including the first count value (CNT1=2) and transmits it to the MCU 325, the MCU 325 converts the URL information (URL/CNT1) including the first count value (CNT1=2) into the 2D barcode 332 and transmits the converted 2D barcode 332 to the display driver 327.

The display driver 327 receives the 2D barcode corresponding to the URL information (URL/CNT1) including the first count value (CNT1=2) and transmits it to the display device 330. Accordingly, a previous 2D barcode displayed on the display device 360 is updated to a new 2D barcode.

At this time, the previous 2D barcode is a 2D barcode corresponding to the URL information (URL/CNT1) including the first count value (CNT1=1), and the new 2D barcode is a 2D barcode corresponding to the URL information (URL/CNT1) including an updated first count value (CNT1=2).

The user of the portable device 200 takes a picture of the 2D barcode 362 including the URL information (URL/CNT1) including a URL and the first count value (CNT1=2) using the camera 240 (S310).

The processor 210 of the portable device 200 receives the 2D barcode 362 captured by the camera 240, extracts the URL information (URL/CNT1) including a URL and the first count value (CNT1=2) from the 2D barcode 362, generates second URL information (URL/CNT2) including the second count value (CNT2=2), and transmits it to the communication device 420 of the server 400 through the communication device 250. The processor 210 generates second URL information (URL/CNT2) that is identical to the URL information (URL/CNT1).

The processor 410 of the server 400 receives the second URL information (URL/CNT2(=2)) through the communication device 420 and determines whether the second URL information (URL/CNT2(=2)) has been used at least once before (S312).

The processor 410 compares the second count value (CNT2=2) included in the second URL information (URL/CNT2) with the third count value (CNT3=1) included in the third URL information (URL/CNT3) stored in the memory device 430 (S312).

When the second count value (CNT2=2) and the third count value (CNT3=1) are not identical (YES in S312), that is, when it is determined that the 2D barcode 332 corresponding to the URL information (URL/CNT1(=2) or URL/CNT2(=2)) has never been used before (YES in S312), the processor 410 determines that the second URL information (URL/CNT2(=2)) mapped to the 2D barcode 332 is valid (YES in S312), allows the portable device 200 to access and open the webpage corresponding to the second URL information (URL/CNT2), updates the third count value (CNT3) from '1' to '2,' and generates third URL information (URL/CNT3) including the third count value (CNT3=2) to store it in the memory device 430.

According to another embodiment, when the user of the portable device 200 operates or pushes the button 329 included in a switch, the interrupt signal EIV with a low level (L) is supplied to the MCU 325 through the interrupt terminal 325_1 (S320).

The MCU 325 is enabled or woken up in response to the interrupt signal EIV with a low level (L) (S320). The enabled or woken up MCU 325 controls the second NFC reader 323 so that the second NFC reader 323 outputs an NFC signal to the first antenna ANT1 (S322).

As described above, the processor 410 of the server 400 compares the second count value (CNT2) included in the second URL information (URL/CNT2) transmitted from the portable device 200 with the third count value (CNT3) included in the third URL information (URL/CNT3) stored in the memory device 430. When the second count value (CNT2) and the third count value (CNT3) are identical, the processor 410 determines that URL information transmitted from the portable device 200, i.e., the second URL information (URL/CNT2), is not valid and blocks (or disallows (refuses or rejects) an access to) the webpage corresponding to the second URL information (URL/CNT2), and when the second count value (CNT2) and the third count value (CNT3) are not identical, the processor 410 determines that URL information transmitted from the portable device 200, i.e., the second URL information (URL/CNT2), is valid and allows an access to the webpage corresponding to the second URL information (URL/CNT2).

Therefore, the system 100_1, 100_2, or 100_3 according to the embodiments of the present disclosure may prevent misuse (e.g., false orders) by scanning a 2D barcode even if the 2D barcode used once is leaked through a blog or SNS.

Figure 7:
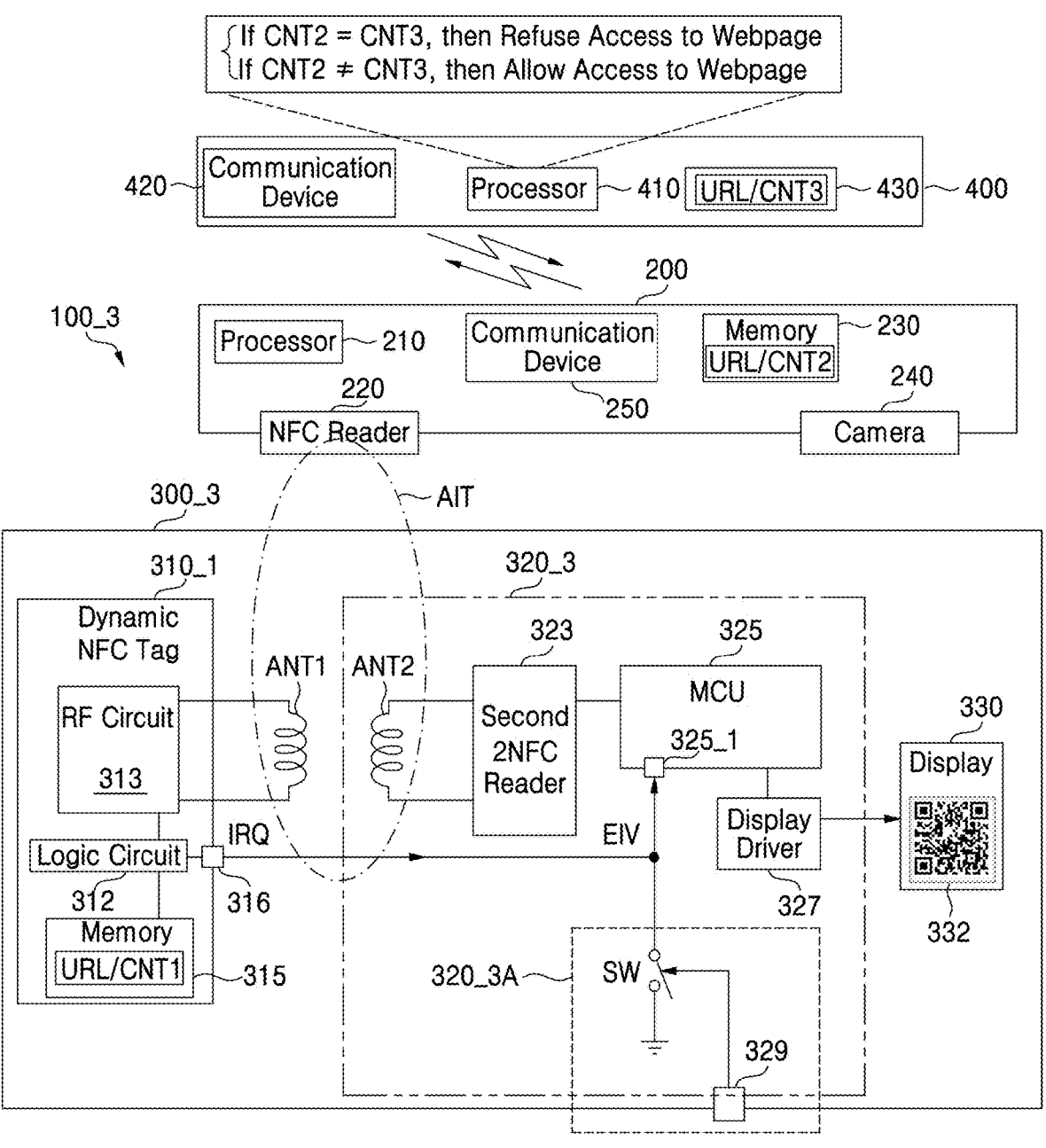
FIG. 7 is a schematic block diagram of a system including a variable 2D barcode generation device that generates a 2D barcode linked to NFC data using a dynamic NFC tag and a switch according to an embodiment of the present invention.

FIG. 7 is a schematic block diagram of a system including a variable 2D barcode generation device that generates a 2D barcode linked to NFC data using a dynamic NFC tag and a switch according to an embodiment of the present invention.

Referring to FIG. 7, the system 100_3 includes a portable device 200, a variable 2D barcode generation device 300_3, and a server 400. The variable 2D barcode generation device 300_3 includes a dynamic NFC tag 310_1 including a first antenna ANT1, a 2D barcode controller 320_3 including a second antenna ANT2, and a display device 330.

The passive NFC tag 310 including the first antenna ANT1 shown in FIGS. 1 and 2 may not generate an interrupt signal by itself based on an RF signal output from the portable device 200, for example, an NFC signal (or NFC data), but the dynamic NFC tag 310_1 shown in FIG. 7 may generate an interrupt request signal IRQ by itself based on an RF signal output (or emitted) from the portable device 200, for example, an NFC signal (NFC data or electromagnetic waves).

The 2D barcode controller 320_3 includes the second antenna ANT2, the second NFC reader 323, the MCU 325, and the display driver 327.

According to embodiments, the variable 2D barcode generating device 300_3 may further include a power source (e.g., a battery or an adapter) capable of supplying an operating voltage to each of the elements or components 320_3A, 323, 325, 327, and 330.

The dynamic NFC tag 310_1 receives an NFC signal from the NFC reader 220 and performs steps (S110 to S116) described with reference to FIG. 4 and steps (S210 to S216) described with reference to FIG. 5.

In addition, a logic circuit (microcontroller unit or chipset) 312 of the dynamic NFC tag 310_1 generates an interrupt request signal IRQ with a low level (L) by itself and transmits it to the interrupt terminal 325_1 of the MCU 325 through an interrupt request terminal 316 when an NFC signal is received from the NFC reader 220 (316). A function of the interrupt request signal IRQ is the same as a function of the interrupt signal EIV.

The MCU 325 receives the interrupt request signal IRQ with a low level (L) through the interrupt terminal 325_1 and performs the steps (S120 to S124) described with reference to FIG. 4 or the steps (S322 to S326) described with reference to FIG. 6 in response to the interrupt request signal IRQ.

In addition, the MCU 325, the display driver 327, and the display 330 perform the step (S126) described with reference to FIG. 4, or the step (S326) described with reference to FIG. 6.

According to the embodiments, the 2D barcode controller 320_3 includes the second antenna ANT2, an interrupt signal generation circuit 320_3A, the second NFC reader 323, the MCU 325, and the display driver 327.

The interrupt signal generation circuit 320_3A generates an interrupt signal EIV with a low level (L) according to the operation of the button 329 and transmits this signal EIV to the interrupt terminal 325_1 of the MCU 325.

The MCU 325 receives the interrupt signal EIV with a low level (L) through the interrupt terminal 325_1, and performs the steps (S120 to S124) described with reference to FIG. 4 or the steps (S322 to S326) described with reference to FIG. 6 in response to the interrupt signal EIV.

In addition, the MCU 325, the display driver 327, and the display 330 perform the step (S126) described with reference to FIG. 4 or the step (S326) described with reference to FIG. 6.

Except that the logic circuit 312 of FIG. 7 generates an interrupt request signal IRQ, an interaction between the logic circuit 311 and the RF circuit 313 described with reference to FIGS. 1 and 2 is the same as or similar to an interaction between the logic circuit 312 and the RF circuit 313 shown in FIG. 7, and an interaction between the logic circuit 311 and the memory device 315 described with reference to FIGS. 1 and 2 is the same as or similar to an interaction between the logic circuit 312 and the memory device 315 shown in FIG. 7.

The variable 2D barcode generation device according to the embodiment of the present invention may generate a 2D barcode corresponding to URL information stored in an NFC tag in real time and update it on a display device in real time, so that it can fundamentally block a problem of misusing a 2D barcode used once even if the 2D barcode is leaked through a blog or SNS.

In the variable 2D barcode generation system including the variable 2D barcode generation device according to the embodiment of the present invention, a server receives URL information mapped to a 2D barcode scanned by a portable device, and when the received URL information is identical to URL information previously received, the portable device is not allowed to access a webpage corresponding to the received URL information, so that it is possible to prevent reuse of a 2D barcode that has been used once.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A variable two-dimensional (2D) barcode generation device comprising:

a Near Field Communication (NFC) tag configured to store Uniform Resource Locator (URL) information for accessing a webpage and generate an antenna voltage by collecting electromagnetic waves emitted from a portable device;

a display device; and a 2D barcode controller configured to read the URL information from the NFC tag based on the antenna voltage to generate a 2D barcode mapped to the URL information, and display the 2D barcode on the display device.

2. The variable 2D barcode generation device of claim 1, wherein the 2D barcode controller includes:

an interrupt signal generation circuit configured to generate a control voltage based on the antenna voltage generated at a first antenna of the NFC tag and generate an interrupt signal when the control voltage is higher than a reference voltage;

an NFC reader connected to a second antenna that is magnetically resonantly coupled with the first antenna; and a microcontroller unit configured to control the NFC reader so that the NFC reader reads the URL information using the first antenna and the second antenna in response to the interrupt signal.

3. The variable 2D barcode generation device of claim 2, further comprising:

a display driver, wherein the microcontroller unit is configured to convert the URL information transmitted from the NFC reader into the 2D barcode and transmits the 2D barcode to the display driver, and wherein the display device is configured to display the 2D barcode output from the display driver in real time.

4. The variable 2D barcode generation device of claim 3, wherein the interrupt signal generation circuit includes:

a rectifier configured to generate a rectified voltage by rectifying the antenna voltage;

a transistor having a threshold voltage corresponding to the reference voltage; and an RC filter configured to generate the control voltage by performing low-pass filtering on the rectified voltage, and wherein the transistor is configured to output the interrupt signal when the control voltage is higher than the reference voltage.

5. The variable 2D barcode generation device of claim 4, wherein the microcontroller unit includes an interrupt terminal connected to an output terminal of the transistor that outputs the interrupt signal, and wherein the variable 2D barcode generation device further includes a switch connected to the interrupt terminal and generating the interrupt signal.

6. The variable 2D barcode generation device of claim 1, wherein the NFC tag is configured to:

when the electromagnetic waves are received, update the URL information after transmitting the URL information to the portable device; and update updated URL information again after transmitting the updated URL information to the 2D barcode controller according to a URL transmission command transmitted from the 2D barcode controller.

7. A variable two-dimensional (2D) barcode generation device comprising:

a Near Field Communication (NFC) tag configured to store Uniform Resource Locator (URL) information for accessing a webpage;

a display device;

a switch configured to generate an interrupt signal; and a 2D barcode controller configured to read the URL information from the NFC tag in response to the interrupt signal to generate a 2D barcode mapped to the URL information in real time, and display the 2D barcode generated in real time on the display device.

8. The variable 2D barcode generation device of claim 7, wherein the 2D barcode controller includes:

a display driver;

an NFC reader that is connected to a second antenna that is magnetically resonantly coupled with a first antenna of the NFC tag; and a microcontroller unit configured to control the NFC reader so that the NFC reader reads the URL information from the NFC tag using the first antenna and the second antenna in response to the interrupt signal, wherein the microcontroller unit is configured to generate the 2D barcode mapped to the URL information transmitted from the NFC tag in real time and transmits the 2D barcode generated in real time to the display driver, and wherein the display driver is configured to display the 2D barcode generated in real time on the display device.

9. A variable two-dimensional (2D) barcode generation device comprising:

a Near Field Communication (NFC) tag configured to store Uniform Resource Locator (URL) information for accessing a webpage and generate an interrupt request signal when electromagnetic waves emitted from a portable device are received;

a display device; and a 2D barcode controller configured to read the URL information from the NFC tag in response to the interrupt request signal to generate a 2D barcode mapped to the URL information in real time, and display the 2D barcode on the display device in real time.

10. The variable 2D barcode generation device of claim 9, wherein the 2D barcode controller includes:

an NFC reader connected to a second antenna that is magnetically resonantly coupled with a first antenna of the NFC tag;

a microcontroller unit that includes an interrupt terminal for receiving the interrupt request signal, and controls the NFC reader so that the NFC reader reads the URL information using the first antenna and the second antenna in response to the interrupt signal; and a display driver, wherein the microcontroller unit is configured to generate the 2D barcode mapped to the URL information transmitted from the NFC reader in real time, and transmit the 2D barcode generated in real time to the display driver, and wherein the display device is configured to display the 2D barcode in real time according to control of the display driver.

11. A variable two-dimensional (2D) barcode generation device comprising:

a Near Field Communication (NFC) tag configured to store URL information for accessing a webpage;

a display device;

a switch configured to generate an interrupt signal; and a 2D barcode controller configured to read the URL information from the NFC tag in response to the interrupt signal to generate a 2D barcode mapped to the URL information in real time, and display the 2D barcode on the display device in real time.

12. The variable 2D barcode generation device of claim 11, wherein the 2D barcode controller includes:

an NFC reader connected to a second antenna that is magnetically resonantly coupled with a first antenna of the NFC tag;

a microcontroller unit that includes an interrupt terminal for receiving the interrupt signal, and configured to control the NFC reader so that the NFC reader reads the URL information using the first antenna and the second antenna in response to the interrupt signal; and a display driver, wherein the microcontroller unit is configured to generate the 2D barcode mapped to the URL information transmitted from the NFC reader in real time, and transmit the 2D barcode generated in real time to the display driver, and wherein the display device displays the 2D barcode in real time according to control of the display driver.

* * * * *